April 1, 1941.　　　G. W. ANDERSON　　　2,237,067
ENVELOPE MACHINE
Original Filed Dec. 5, 1936　　8 Sheets-Sheet 1

Inventor
Gustaf W. Anderson
by J. Stanley Churchill atty.

April 1, 1941.  G. W. ANDERSON  2,237,067
ENVELOPE MACHINE
Original Filed Dec. 5, 1936   8 Sheets-Sheet 5

April 1, 1941. G. W. ANDERSON 2,237,067
ENVELOPE MACHINE
Original Filed Dec. 5, 1936 8 Sheets-Sheet 6

Inventor
Gustaf W. Anderson
by J. Stanley Churchill
atty.

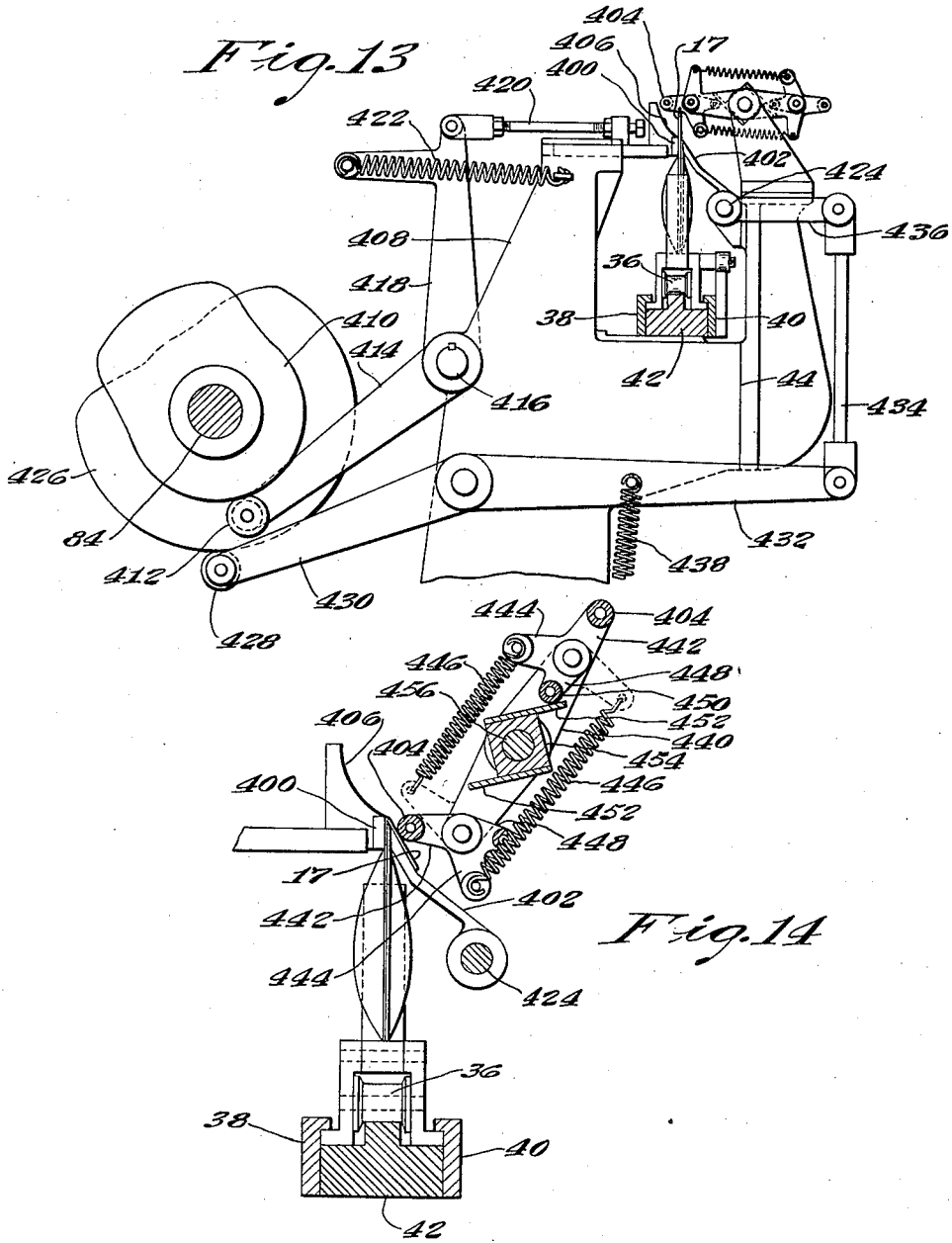

Patented Apr. 1, 1941

2,237,067

UNITED STATES PATENT OFFICE 2,237,067

ENVELOPE MACHINE

Gustaf W. Anderson, North Quincy, Mass., assignor to Pneumatic Scale Corporation, Limited, Quincy, Mass., a corporation of Massachusetts Original application December 5, 1936, Serial No. 114,422. Divided and this application January 10, 1940, Serial No. 313,185

10 Claims. (Cl. 271—87)

This invention relates to an envelope machine and more particularly to a machine for inserting an article in an envelope.

The invention has for an object to provide a novel and improved machine of the character specified in which provision is made for forming successive envelopes and for handling and stacking the envelopes as they are formed by novel and improved mechanism and by which the operation of the entire machine is rendered positive and of an automatic nature.

With this object in view and such others as may hereinafter appear, the invention consists in the envelope machine, in the forming, filling, closing and sealing machine for envelopes and in the various structures, arrangements and combination of parts hereinafter described and particularly defined in the claims at the end of this specification.

Figure 1:
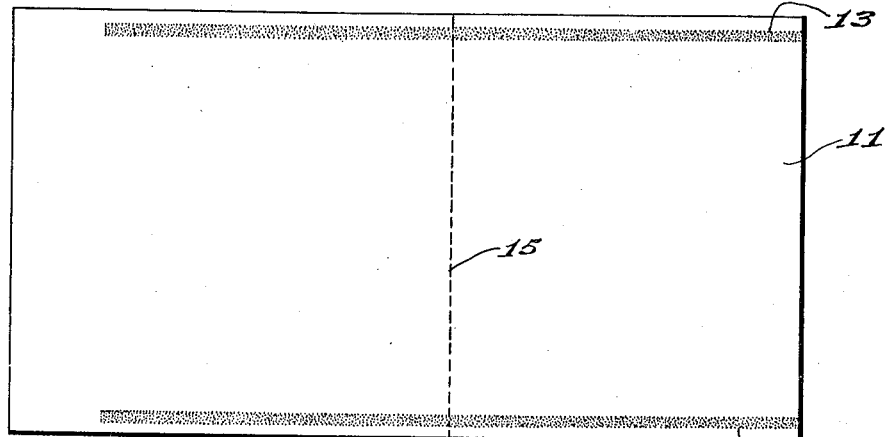
Figure 2:
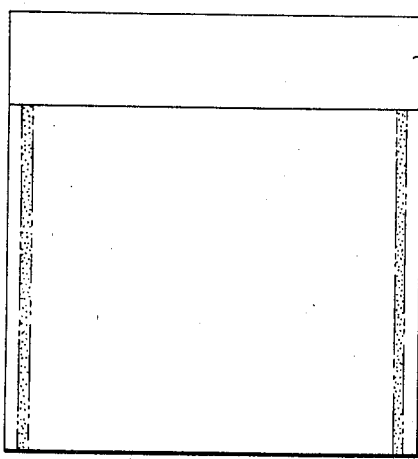
Figure 3:
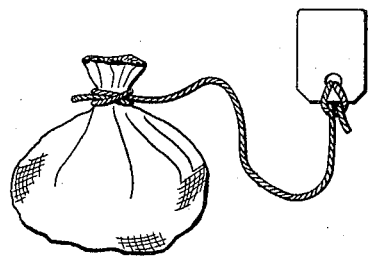
Figure 4:
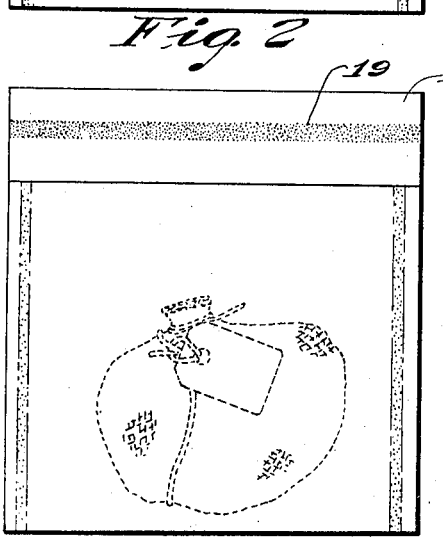
Figure 5:
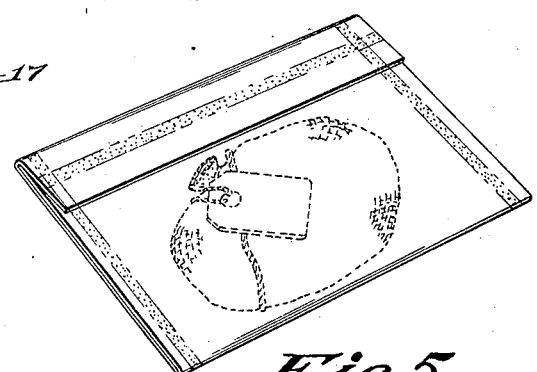
Figure 6:
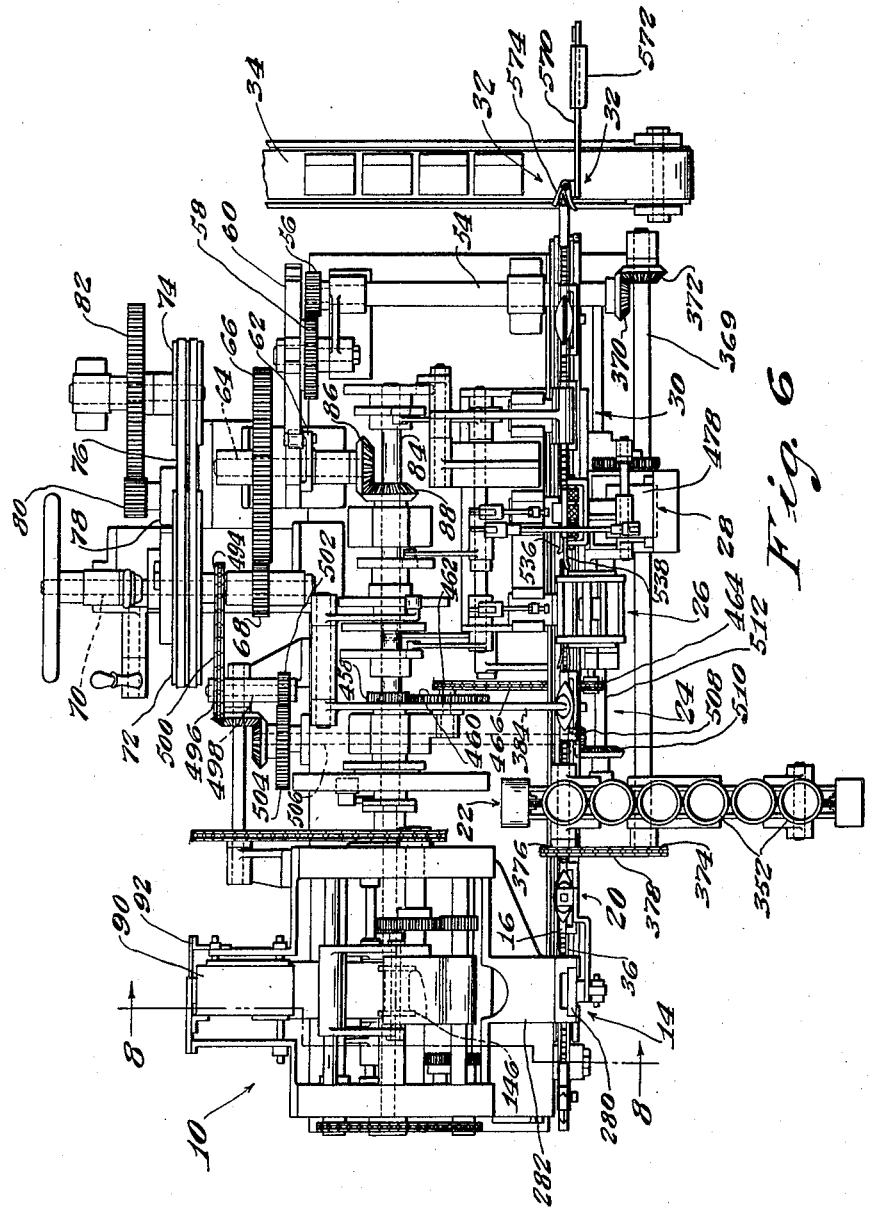
Figure 7:
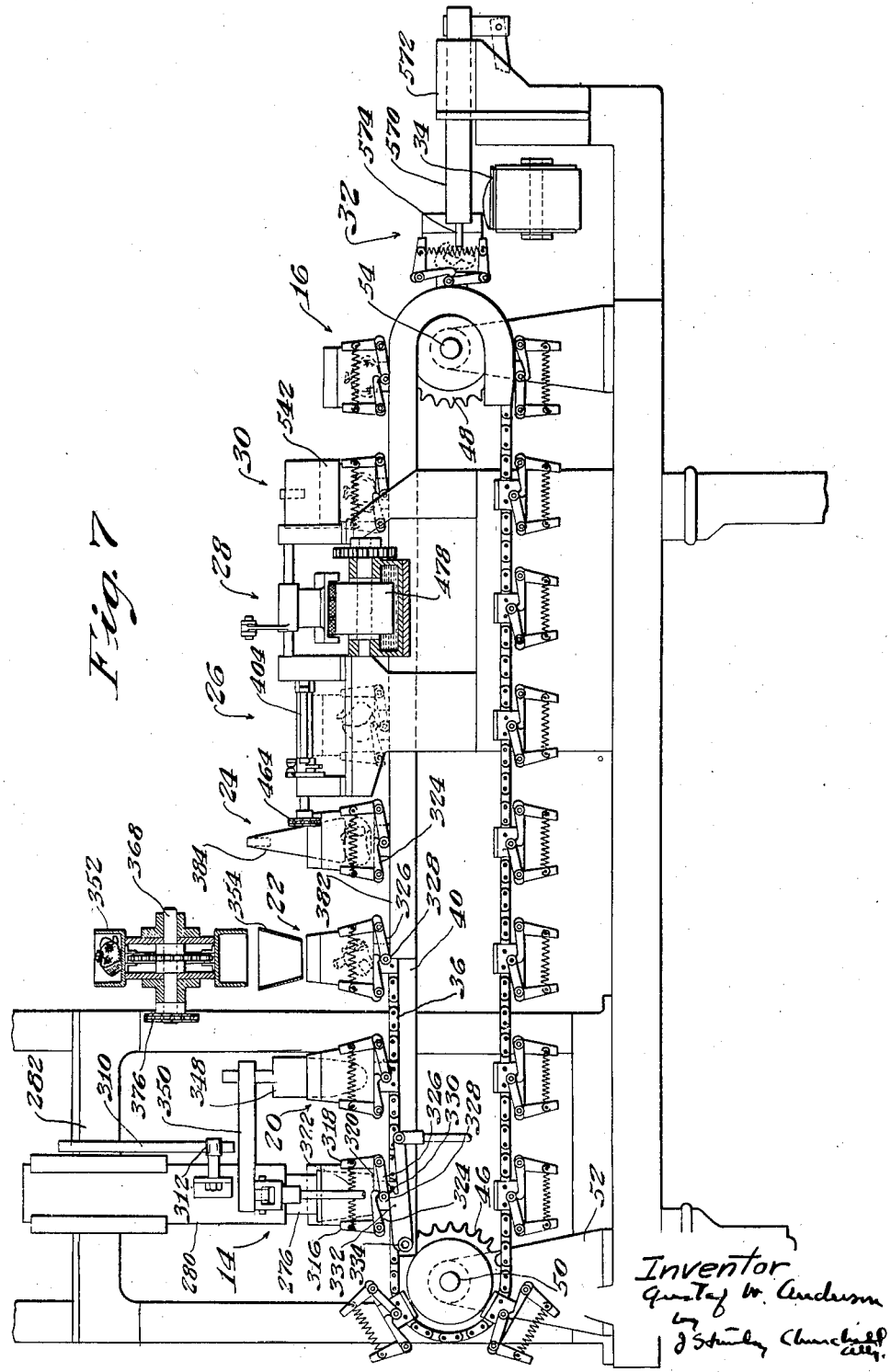
Figure 8:
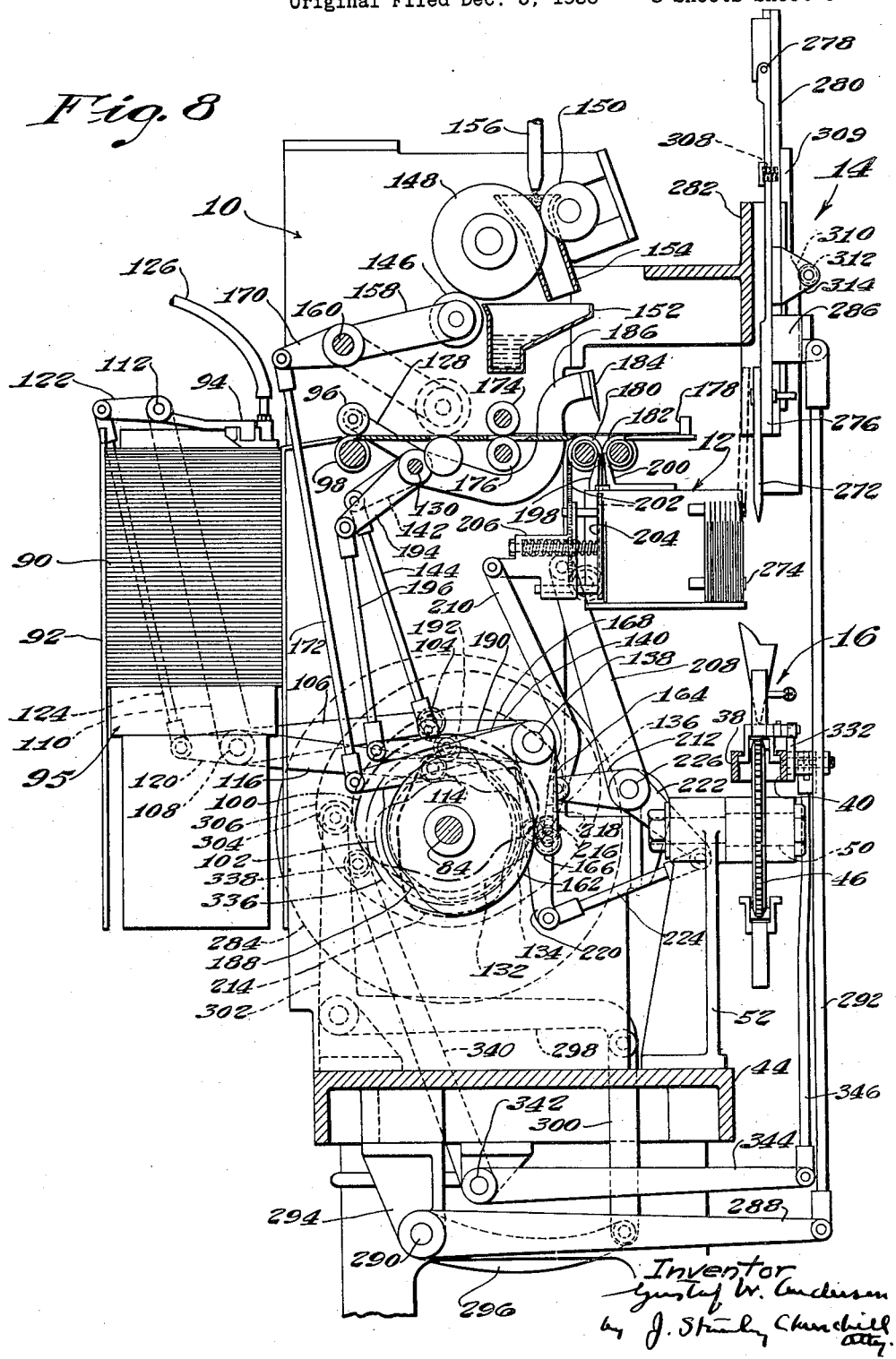
Figure 9:
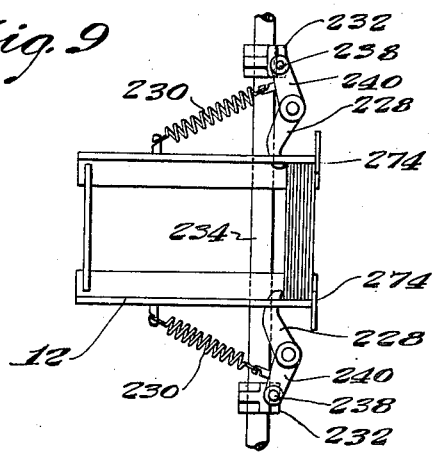
Figure 10:
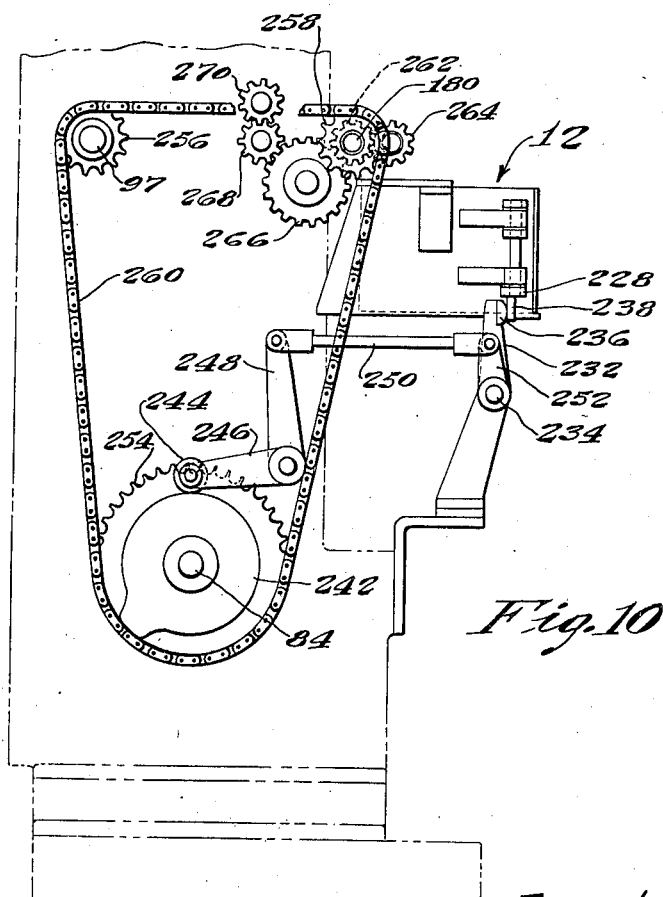
Figure 11:
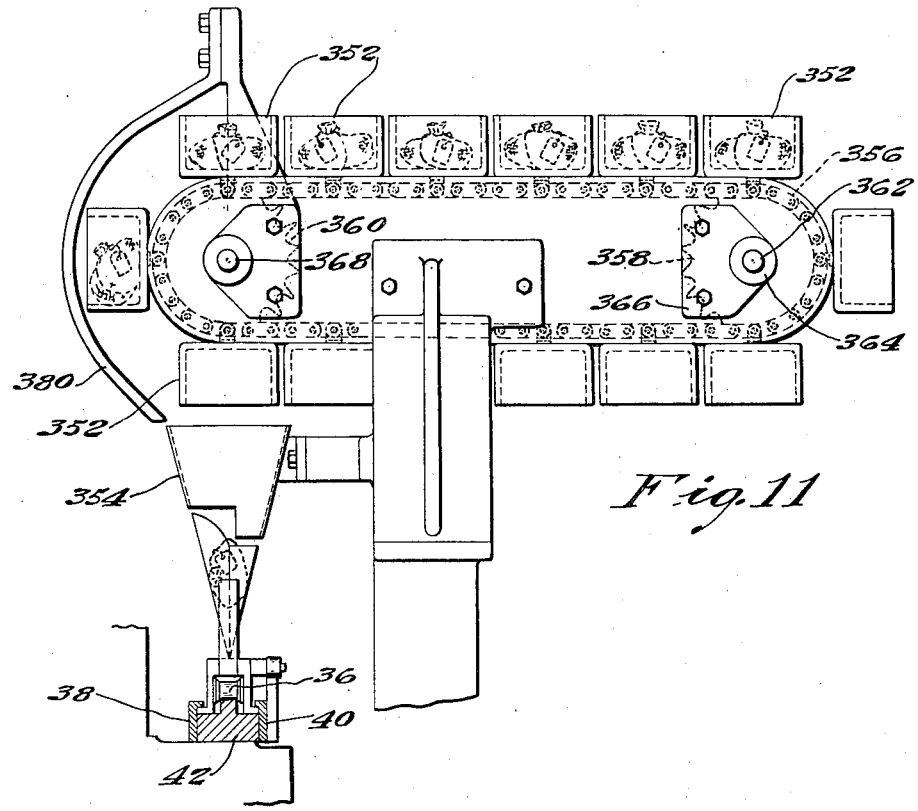
Figure 12:
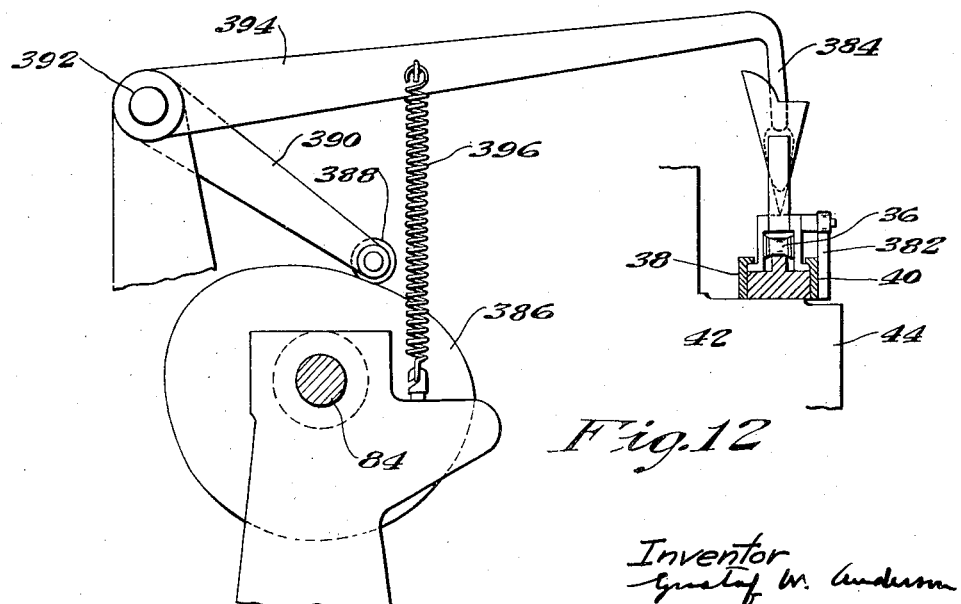
Figure 15:
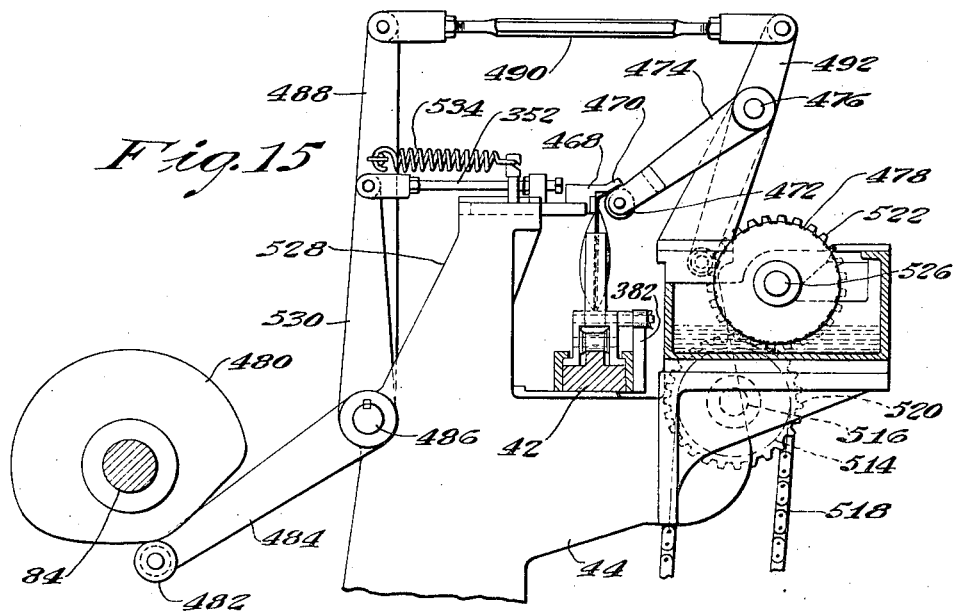
Figure 16:
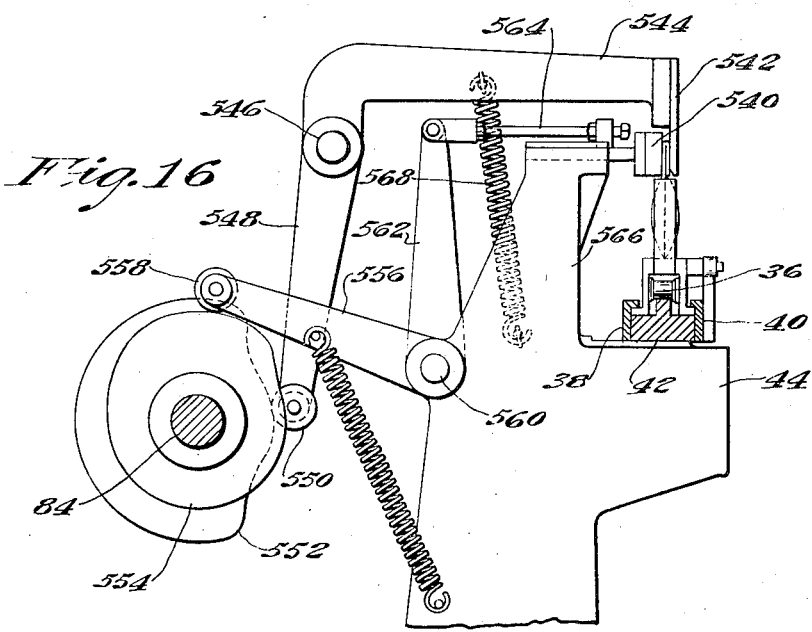

In the drawings illustrating the preferred embodiment of the invention, Fig. 1 is a view of the blank from which the envelope is formed; Fig. 2 is a view of an envelope produced on the present machine; Fig. 3 is a perspective view of a commerical tea bag which is inserted into the envelope by the present machine; Figs. 4 and 5 are views in front elevation and perspective, respectively, of an envelope with a tea bag inserted, Fig. 4 being shown with the sealing flap open; Fig. 6 is a plan view of the machine embodying the present invention; Fig. 7 is a diagrammatic view in front elevation of the machine; Fig. 8 is a longitudinal sectional view on the line 8—8 of Fig. 6 showing the blank feeding and envelope forming sections of the machine; Figs. 9 and 10 are views in plan and side elevation respectively of the magazine for accumulating a supply of the formed envelopes; Fig. 11 is a side elevation of the carrier for depositing the tea bags into the envelopes; Fig. 12 is a detail in side elevation of the pusher station at which the tea bags are thrust more firmly into the bag; Fig. 13 is a view in side elevation of the mechanism for folding the sealing flap of the envelope; Fig. 14 is an enlarged detail of part of the mechanism shown in Fig. 13; Fig. 15 is a view in side elevation of the sealing flap adhesive applying mechanism, and Fig. 16 is a side elevation of the press mechanism for firmly setting the sealing flap.

For purposes of illustration the different features of the invention have been illustrated as embodied in a machine for inserting individual tea bags into individual envelopes.

Heretofore it has been the general practice to supply the trade with commercial tea bags packed loosely or in bulk in cartons which after being opened are subject to contamination by dust or other particles in the air, or by handling. To overcome this objection the present invention contemplates a machine for packing the tea bags in individual envelopes of "Glassine" or similar paper to the end that the tea bags are fully protected both in transit and in storage from contamination and are delivered to the customer in a pure and sanitary condition. Inasmuch as the tea bag must be deposited bodily into the tea pot or cup of hot water to brew the tea, the cleanliness of the material in which the tea is packed is an important factor and the individually packaged tea bag is greatly preferred by patrons of the better hotels and restaurants.

Referring now to the drawings which illustrate the different features of the invention as embodied in a unitary machine for forming, filling, closing and sealing envelopes, the machine in general comprises an envelope forming section 10 which deposits the formed envelopes into a magazine 12 from which the envelopes are extracted individually by a stripping mechanism generally indicated at 14. The stripping mechanism deposits the envelopes into pockets or holders 16 carried by an endless chain 36 and provision is made for intermittently moving the conveyer chain to present the envelope to succeeding stations. As herein illustrated, after leaving the stripper station 14 the open envelope is delivered to a plunger station 20 where the mouth of the envelope is shaped or rounded out to facilitate the insertion of an article into the envelope at station 22. The envelope is then delivered to station 24 where the article, which has been loosely dropped into the envelope, is thrust deeper into the envelope to permit the operations of folding the top flap at station 26, and applying adhesive to the flap at station 28. The flap is then firmly pressed to seal the envelope at station 30 and thereafter the sealed envelope is moved into an ejecting station herein shown at 32 where the filled and closed envelope is discharged from the machine to be carried away on an outgoing conveyer 34.

The above mechanisms are all corelated and timed to operate in their proper relationship with respect to each other and to the envelope as it progresses through the machine in the pocket or holder 16. As illustrated herein the pocket 16 comprises one of a series of such pockets operatively supported upon the conveyer chain 36 and provision is made for intermittently moving the conveyer chain to present the pocket to succeeding stations. The conveyer chain 36 runs in guides 38, 40, operatively supported upon frame members 42 secured to the platen 44 of the machine. The conveyer chain 36 is arranged to run over sprockets 46, 48 and the sprocket 46 is loosely mounted on a stud 50 secured to a bracket 52 fastened to the platen or frame 44 of the machine. The sprocket 48 is fast on a shaft 54 and is arranged to be driven by mechanism including cooperating gears 56, 58, and the usual Geneva driving members, Geneva wheel 60 and Geneva driving arm 62. The Geneva driving arm is fast on a shaft 64 which is provided with a gear 66 which is driven by a gear 68 fast on a driving shaft 70. The driving shaft 70 is provided with a pulley 72 which is connected to a pulley 74 by a belt 76. The pulley 74 is connected to a motor 78 through reduction gearing 80, 82.

A shaft 84, driven from the driving shaft 64 through cooperating bevel gears 86, 88, comprises the cam shaft upon which are mounted the various cams for operating the mechanisms above referred to and it will be observed that the cam shaft 84 is driven with continuous uniform motion while the conveyer chain 36 carrying the holders 16 for operatively supporting the envelopes is driven with a step by step intermittent motion and the various cams on the shaft 84 are so designed as to cause the operations referred to to be performed while the envelope and the conveyer pockets 16 are at rest.

The mechanism for forming the envelope from a blank sheet will now be described. As herein illustrated, see Fig. 8, the blank sheets are fed from a stack 90 stored in a magazine 92 to the adhesive applying and folding means by a suction pad 94 which is arranged to transfer the uppermost sheet in the stack from the stack to a pair of feed rollers 96, 98. The suction pad 94 is given an upward and forward motion by cams 100, 102, mounted on the cam shaft 84. The cam 100 which causes the forward motion cooperates with a roller 104 attached to one arm 106 of a bell crank pivoted at 108 and the second arm 110 of the bell crank is pivotally secured to an intermediate portion 112 of the suction pad 94. The cam 102 which produces the upward motion cooperates with a roller 114 secured to one arm 116 of a two armed lever pivoted at 108, the second arm 120 being attached to the end 122 of the suction pad 94 by a connecting rod 124. In operation, the pad 94 is lowered to pick up the topmost sheet by suction created by a vacuum pump, not shown, to which the pad is connected by the flexible tube 126 and the pad is then raised and carried forward to present the forward edge of the blank sheet between the feed rolls 96, 98 above referred to. The stack of sheets being fed into the machine is kept at a constant level by any well known elevating mechanism, generally indicated at 95 and which operates to elevate the whole stack in the magazine automatically to compensate for the sheets which have been removed by the air suction means. Reference may be had to patent of A. R. Scholin, No. 1,517,254, issued December 2, 1924, for a full and complete description of such mechanism and inasmuch as the details of such elevating mechanism form no part of the present invention, further description thereof is believed to be unnecessary.

In order to permit the forward edge of the blank sheet to be presented between the rollers 96, 98, the upper roller is arranged to be rocked upwardly away from the lower roll and then permitted to descend into cooperation with the lower roll to feed the blank sheet forward. The upper roll is mounted on the end of a rocker arm 128 pivoted at 130 and is rocked by a cam 132 fast on the cam shaft 84, through connections including a cooperating roller 134 mounted on one arm 136 of a bell crank loosely mounted on the shaft 138, a second arm 140 connected to a lever 142 secured to a shaft 138 by a connecting rod 144. It will be understood that all of the cam levers are provided with springs, not shown, which hold the rollers against the cams.

As will be apparent from an inspection of Figs. 1 and 2, the envelope is formed from the blank sheet 11 by applying strips of adhesive 13 along the longitudinal edges of the sheet and then folding the sheet along a line 15 to present the adhesively coated surfaces together so that a flat envelope with an extended flap is produced. It will be noted that the portion of the sheet which will form the extended flap is not supplied with adhesive during this stage of the operation of the machine.

The adhesive is applied to the blank sheet by transferring rolls 146 which are arranged to be rocked from the glue roll 148 to the blank sheet to apply the adhesive and then rocked upwardly again during the movement of the sheet so that the strips of adhesive will be stopped before the flap portion of the sheet is reached. As herein shown, the glue is supplied to the glue roll 148 in any usual or preferred manner between the glue roll and a cooperating spreader roll 150, the surplus glue being permitted to flow into a pan 152 through a guide 154 and thereafter returned to the glue rolls through the supply pipe 156 by a pump, not shown. As herein illustrated, the adhesive applying roll is mounted on one arm 158 of a two armed lever loosely mounted on a shaft 160 and is arranged to be rocked by a cam 162 fast on the cam shaft 84 by connection including a cam lever 164 pivoted on the shaft 138 and provided with a cam roll 166, and a second lever 168 which is connected to the second arm 170 of the two armed lever by a connecting rod 172.

After the blank has received its application of adhesive it is gripped between a second pair of feed rolls 174, 176 which advance the sheet up against a stop 178 in a position directly above a pair of folding rolls 180, 182 and below a folding blade 184. The folding blade 184 is mounted on an arm 186 loosely mounted on the shaft 130 and the arm 186 is arranged to be rocked by a cam 188 fast on the cam shaft 84 and connections including a cam lever 190, loosely mounted on the shaft 138 and provided with a cam roll 192 at its intermediate portion. The lever 190 is connected at its end to a second arm 194 by a connecting rod 196. The second arm 194 is rigidly attached to the folding arm 186 and through the connections described the folding blade 184 is caused to descend and fold the sheet of paper between the folding rolls 180, 182. The rolls 180, 182 pass the sheet downwardly between guides 198, 200 and into a magazine 12 where a sufficient quantity of the envelopes are stacked to permit the adhesive to set before being withdrawn from the magazine by the stripper mechanism 14. Parallel vertical belts 202 are provided to insure the envelope being presented in a vertical position in front of a pusher plate 204.

In order to stack the envelopes in the forward part of the magazine a pusher mechanism is provided including the pusher plate 204 which is yieldingly mounted in a bracket 206. The pusher plate 204 is advanced from a position beneath the folding rolls, 180, 182 to a position against the rear of the stack in the magazine through provision of the linkage 208, 210, 212, which imparts a substantially straight line motion, and is actuated by a cam 214 fast on the cam shaft 84. Cooperating with the cam 214 is a cam roll 216 mounted on the end of a lever 218 loosely mounted on the shaft 138 and a second arm 220 is connected to a lever 222 by a connecting rod 224. The lever 222 fixed to a rocker shaft 226 cooperates with the parallel linkage above referred to. During the operation of the machine as each individual envelope is advanced to the rear of the stack provision is made for retaining the envelopes in stacked relationship in the forward part of the magazine and as herein shown, see Figs. 9 and 10, this is accomplished by a pair of pivotally and yieldingly mounted retaining fingers 228 which are normally urged against the back of the stack by springs 230. The fingers 228 are arranged to be retracted or swung out of the way to permit a succeeding envelope to be delivered by levers 232 which are mounted to rock on a shaft 234 and which are provided with bearing surfaces 236 adapted to engage pins 238 depending from the underside of extensions 240 from the retaining fingers 228. The levers are rocked by a cam 242 fast on the cam shaft 84 through the cooperating cam roll 244 and linkage 246, 248, 250, 252.

The feed rolls 96, 98, 174, 176 and folding rolls 180, 182 above described are arranged to be driven from the cam shaft 84 by a chain and sprocket drive as illustrated in Fig. 9. The driving sprocket 254 fast on the cam shaft 84 is connected to a sprocket 256 on the feed roll shaft 97 and a sprocket 258 on the folding roll shaft 180 by a chain 260. The folding rolls are geared together by gears 262, 264, and the gear 262 is arranged to drive the feed rolls 174, 176 through an idler gear 266 and cooperating gears 268, 270.

From the description thus far, and from an inspection of Fig. 8, it will be apparent that in the illustrated machine the envelopes are produced from a blank sheet and delivered, ready for use, to the magazine 12. It is now proposed to withdraw the envelopes individually and successively from the forward end of the magazine and deposit them into the pockets 16. For this purpose a stripping mechanism 14 is employed and as herein shown comprises a blade 272 which is arranged to be elevated, inserted into the foremost envelope, and then given an outward and descending motion to withdraw the envelope from the stack. The forward end of the stack is normally retained in the magazine by retaining members 274. As illustrated herein, see Fig. 8, the blade 272 is secured to an arm 276 which is pivotally mounted at 278 on a vertical slide bar 280. The slide bar 280 is mounted in a bracket 282 and is arranged to be vertically reciprocated by a closed cam 284 fixed to the cam shaft 84. As herein shown, a connecting member 286 attached to the blade lever 276 is connected to a lever 288 fixed to a shaft 290 by a rod 292. The shaft 290 mounted in a bracket 294 below the platen 44 of the machine, is provided with a second lever 296 which is connected to one arm 298 of a bell crank by a link 300. The other arm 302 of the bell crank is provided with a cam roll 304 which runs in the path 306 of the cam 284. The blade arm 276 which is normally urged inwardly against the foremost envelope in the stack by a spring 308, is arranged to be rocked outwardly by a stationary cam piece 310 in cooperation with a cam roll 312 mounted in a bracket 314 secured to the blade arm 276 so that as the blade descends the roll 312 will leave the low spot 309 of the cam piece and ride up on the high part 310.

Referring now to Figs. 7 and 8, it will be observed that the pockets 16 comprise fingers 316, 318 which are provided with V grooves to hold the envelopes. The fingers 316, 318 are pivotally mounted in a base section 320 and are normally urged toward each other by a spring 322. The fingers are provided with arms 324, 326, one of which 326 is provided with a cam roll 328, the other arm 324 resting against the arm 326 in cooperating relationship. It will be noted that the fingers are normally held in an angular position in order to bulge out or open the mouth of the envelope to facilitate the reception of the tea bag or other article, the fingers being limited in their inward movement by a pin 330 extending from the conveyer chain and which engages the arm 326 of the pocket. However, in order to insert the envelope into the pocket at the stripping station 14, the fingers 316, 318 are arranged to be spread to a vertical or perpendicular position by a cam piece 332 which is pivoted at 334 and which is arranged to be rocked into engagement with the cam roll 328 on the arm 326. As herein illustrated the cam piece 332 is arranged to be rocked by a cam 336 fixed to the cam shaft 84 through connections including a cam roll 338 mounted on a lever 340 and fixed to a rocker shaft 342, a second lever 344 also fixed to the rocker shaft 342 and a connecting rod 346. Through the connections as described, the cam piece 332 is rocked to spread the fingers at the time the stripper blade 272 is about to descend to insert an envelope and after the stripper blade 272 has been withdrawn, the cam piece is again rocked to permit the fingers to open the mouth of the envelope. In order to insure the mouth of the envelope being wide open to receive the article to be inserted, a plunger 348 is provided at the next station 20 which is operated by the stripper blade slide bar 280 being secured to the latter by a connecting member 350 and operating simultaneously therewith. As herein shown, the plunger 348 enters the envelope as the stripper descends and is withdrawn on the return stroke.

The pocket and the envelope are now advanced to station 22 where the envelope is to receive the article which is to be enclosed. Referring now to Figs. 6, 7 and 11, the article, herein shown as a commercial type of tea bag, is delivered to the envelope from a cup 352 being guided into the envelope by a funnel 354. The cup 352 comprises one of a series of such cups operatively supported upon a chain 356 and provision is made for intermittently moving the chain to deposit the tea bags into successive envelopes. The chain 356 is arranged to run over sprockets 358, 360, and the sprocket 358 is fastened to a shaft 362 running idle in its bearings 364 in the frame member 366. The sprocket 360 is fast to a shaft 368 and is arranged to be driven from the intermittently driven shaft 54 through bevel gears 370, 372, fast on the shafts 54, 369, respectively. A sprocket 374 fast on the other end of the shaft 369 is connected to a sprocket 376 on the shaft 368 by a chain 378. In operation, the tea bags are delivered to the cups 352 from a tea bagging machine or they may be dropped into the cups manually and during the intermittent movement of the chain 356 the cups 352 are inverted to drop their contents into the envelopes. During the movement of the cups 352 around the sprocket 360, the articles are retained in the cups by a curved retaining member 380 until the cup reaches the guide funnel 354. It will be noted that the fingers 316, 318 are arranged to be spread slightly after leaving the article inserting station 14 in order to permit the top of the envelope to be operated upon to fold and seal the flap in a substantially parallel or contacting position. As herein shown, this movement of the fingers is effected by the cam roll 328 which rides up on a stationary cam piece 382 attached to the chain guide 40.

The envelope with its tea bag, loosely dropped into it is now presented to station 24, see Fig. 12, where the article is thrust deeper into the envelope by a pusher member 384 which is arranged to be rocked by a cam 386 fast on the cam shaft 84. A roller 388 cooperating with the cam 386 is mounted on a lever 390 which is fast on a rocker shaft 392 to which the pusher arm 394 is fixed. The spring 396 holds the roll 388 against the cam 386.

The envelope is now advanced to station 26 where provision is made for folding down the flap 17 of the envelope and as best shown in Figs. 13 and 14, the envelope is gripped at its upper end, below the line where the fold is to be made, by a slide member 400 on one side and an angular creasing member 402 on the other side. The flap is arranged to be folded over the creasing member 402 by a yieldingly mounted roll 404 which during the operation of the machine is guided in back of the flap by a concave section 406 of the slide member 400 until it reaches the flap and upon continued movement of the roll 404 the flap is yieldingly creased over the member 402. The slide member 400 is arranged to be reciprocated in a bracket 408 by connections from a cam 410, fixed to the cam shaft 84, including a cam roll 412, mounted in a lever 414 which is fixed to a rocker shaft 416, a second lever 418 also fixed to the shaft 416 and a link 420. A spring 422 holds the cam roll 412 in contact with its cam 410, and through the connections described the slide member is pushed forward to grip the envelope and withdrawn to permit a succeeding envelope to enter. The creasing member 402 which is pivotally mounted on a shaft 424 is arranged to be rocked in timed relation and in cooperation with the slide member 400 by a cam 426 fast on the cam shaft 84. The connecting linkage includes a cam roll 428, levers 430, 432, link 434 and an arm 436 attached to the creasing member 402. A spring 438 holds the cam roll 428 against its cam 426.

The folding roll 404 is one of a set of two which are similarly mounted on the ends of a two armed lever 440. The two armed lever 440 is arranged to rotate on its axis so that each roll 404 operates on alternate envelopes. As herein illustrated the rolls are mounted on one arm 442 of a three armed lever which is pivotally mounted to the two armed lever 440 above referred to. A second arm 444 is provided with a spring 446 which normally urges a third arm 448, provided with a roller 450, against a stop plate 452 attached to a hub 454 on the shaft 456, and arranged to rotate therewith. With this construction it will be seen that the folding roll 404 is yieldingly mounted so that when the unit is rotated the roll will follow the path 406 and fold the flap 17 against the creasing member 402.

Provision is made for rotating the folding roll unit and as best shown in Fig. 6, a gear 458 fast on the cam shaft 84 meshes with a gear 460 which is formed integrally with a sprocket 462 connected to a sprocket 464 on the shaft 456 by a chain 466.

The envelope is now presented to station 28, see Figs. 6 and 15, where provision is made for applying adhesive to the flap. The envelope arrives at this station with the flap extending outwardly at approximately right angles to the envelope having flexed back to this position after leaving station 26. As herein shown, the envelope is operatively supported by a slide member 468 which is provided with an extension 470 against which the flap rests when the adhesive is being applied by an applying roll 472. The adhesive applying roll 472 mounted on an arm 474 is arranged to rock on a shaft 476 from a supply roll 478 to the flap and to thereafter be returned to the supply roll. The arm 474 is rocked by a cam 480 fast on the cam shaft 84 through connections including a cooperating cam roll 482 mounted on a lever 484, a second lever 488 also fast on the rocker shaft 486, a link 490 which connects the lever 488 to an operating lever 492 fixed to the rocker shaft 476 on which the arm 474 is mounted. As will be seen from an inspection of Fig. 4, the adhesive is applied to the flap in a relatively narrow strip 19 this being all the glue necessary to seal the flap.

The supply roll 478 is constantly driven through a drive from the main driving shaft 70 which is provided with a sprocket 494, connected to a sprocket 496 on an intermediate shaft 498 by a chain 500. A gear 502 fixed to the intermediate shaft 498 meshes with a gear 504 on a transversely extended shaft 506 which is provided with a bevel gear 508, meshing with a bevel gear 510 on a shaft 512. A sprocket on the shaft 512 is connected to a sprocket 514 on an idler stud 516 by a chain 518 and the glue roll is driven by the cooperating gears 520, 522, on the shafts 524, 526, respectively.

The sliding member 468 is mounted to reciprocate in a slide bracket 528 through connections from the rocker shaft 486 by a lever 530 fixed to the rocker shaft 486 and a link 532 connecting the lever 530 to the slide member 468. A spring 534 yieldingly urges the cam roll 482 against the cam 480.

After leaving the adhesive applying station 28 the envelope is guided between rails 536, 538 to a presser station 30 and as best shown in Fig. 16, a sliding block 540 is arranged to support the back of the envelope while a rocking member 542 lays the flap down against the envelope whereupon additional pressure is applied by the slide block 540 to firmly seal the flap. The rocking member 542 is mounted upon one arm 544 of a bell crank rockingly mounted on a shaft 546, and the other arm 548 is provided with a cam roll 550 which cooperates with a cam 552 fixed to the cam shaft 84. A cam 554 fast on the cam shaft 84 is arranged to operate the slide block 540 through a lever 556 provided with a cam roll 558 and fixed to a rocker shaft 560, a second lever 562, also fast on the rocker shaft 560, and a link 564 connected to the slide block 540 which is arranged to slide in a bracket 566. A spring 568 holds the cam roll 558 against its cam 554.

After the described operations have been performed, the closed and sealed envelope is moved to the ejecting station generally indicated at 32 which may comprise any known or usual form of ejecting mechanism herein shown as a sliding bar 570 mounted in a slide bracket 572 and provided with fingers 574 which grip the envelope and withdraw it from the pocket 16. The envelope is released when it reaches a position above the conveyer 34 on which it is carried away from the machine.

While the preferred embodiments of the invention have been herein illustrated and described, it will be understood that the invention may be embodied in other forms within the scope of the following claims.

This application is a division of my copending application, Serial No. 114,422, filed December 5, 1936.

Having thus described the invention, what is claimed is:

1. An envelope stacking device comprising a magazine arranged to hold a plurality of envelopes in an upright position, a yieldable pusher member movable in said magazine arranged to transfer individual envelopes delivered thereto from one end of the magazine to the forward end thereof to form a stack, non-yieldable supporting means against which the forward end of the stack is pushed, and means for retaining the envelopes in said forward end and in stacked relation.

2. An envelope stacking device comprising a magazine arranged to hold a plurality of envelopes in an upright position, envelope delivery means including a pair of driven rollers arranged to deposit individual envelopes into the magazine in an upright position, a yieldable pusher member movable in said magazine arranged to transfer the individual envelopes delivered thereto by said delivery means from one end of the magazine to the forward end thereof to form a stack, non-yieldable supporting means against which the forward end of the stack is pushed, and means for retaining the envelopes in said forward end and in stacked relation.

3. An envelope stacking device comprising a magazine arranged to hold a plurality of envelopes in an upright position, envelope delivery means including a pair of driven rollers arranged to deposit individual envelopes into the magazine, a yieldable pusher member movable in said magazine arranged to transfer the individual envelopes delivered thereto by said delivery means from one end of the magazine to the forward end thereof to form a stack, non-yieldable supporting means against which the forward end of the stack is pushed, means for guiding said individual envelopes in an upright position from said delivery means to a position in front of said pusher member, and means for retaining the transferred envelopes in said forward end and in stacked relation.

4. An envelope stacking device comprising a magazine arranged to hold a plurality of envelopes in an upright position, envelope delivery means arranged to deposit individual envelopes into the magazine in an upright position, a yieldable pusher member movable in said magazine arranged to transfer the individual envelopes delivered thereto by said delivery means from one end of the magazine to the forward end thereof to form a stack, non-yieldable supporting means against which the forward end of the stack is pushed, means for reciprocating said pusher member with substantially straight line motion, and means for retaining the transferred envelopes in said forward end and in stacked relation.

5. An envelope stacking device comprising a magazine arranged to hold a plurality of envelopes in an upright position, a yieldable pusher member movable in said magazine arranged to transfer individual envelopes delivered thereto from one end of the magazine to the forward end thereof to form a stack, non-yieldable supporting means against which the forward end of the stack is pushed, and means for retaining the envelopes in said forward end and in stacked relation, and means for retracting said retaining means to permit succeeding envelopes being transferred to be added to the stack.

6. An envelope stacking device comprising a magazine arranged to hold a plurality of envelopes in an upright position, envelope delivery means arranged to deposit individual envelopes into the magazine in an upright position, a yieldable pusher member movable in said magazine arranged to transfer the individual envelopes delivered thereto by said delivery means from one end of the magazine to the forward end thereof to form a stack, means for reciprocating said pusher member with substantially straight line motion, and means for retaining the transferred envelopes in said forward end and in stacked relation, said magazine having relatively narrow stop members at its forward end but being otherwise open to permit withdrawal of the foremost envelope from the stack.

7. An envelope stacking device comprising a magazine arranged to hold a plurality of envelopes in an upright position, envelope delivery means arranged to deposit individual envelopes into the magazine in an upright position, a yieldable pusher member movable in said magazine arranged to transfer the individual envelopes delivered thereto by said delivery means from one end of the magazine to the forward end thereof to form a stack, means for reciprocating said pusher member with substantially straight line motion, and means for retaining the transferred envelopes in said forward end and in stacked relation, said magazine having relatively narrow stop members at its forward end but being otherwise open to permit withdrawal of the foremost envelope from the stack, said yieldable pusher member being operative to advance the stack to present the succeeding envelope into engagement with said stop members when the foremost envelope is withdrawn.

8. The combination with envelope forming means, of means for stacking the formed envelopes comprising a magazine arranged in operative relation to said envelope forming means, a pusher member movable in said magazine adapted to receive successive envelopes from the forming means as they are delivered to one end of said magazine and to transfer said envelopes to the forward end of the magazine to form a stack thereof and fixed stop members at the forward end of the magazine against which the stack is pushed and means for retaining the envelopes in said forward end and in stacked relation.

9. The combination with envelope forming means, of means for stacking the formed envelopes comprising a magazine arranged in operative relation to said envelope forming means, a pusher member movable in said magazine adapted to receive successive envelopes from forming means as they are delivered to one end of said magazine and to transfer said envelopes to the forward end of the magazine to form a stack thereof, non-yieldable supporting means against which the forward end of the stack is pushed, and means for retaining the envelopes in said forward end and in stacked relation, said retaining means including a pair of pivotally mounted retaining fingers in yielding engagement with the rear of said stack, and means cooperating with said retaining means for retracting said fingers to permit succeeding envelopes to be added to the stack.

10. An envelope stacking device comprising a magazine arranged to hold a plurality of envelopes in an upright position, envelope delivery means including a pair of driven rollers arranged to deposit individual envelopes into the magazine, a yieldable pusher member movable in said magazine arranged to transfer the individual envelopes delivered thereto by said delivery means from one end of the magazine to the forward end thereof to form a stack, fixed stop members at the forward end of the magazine against which the stack is pushed, means for guiding said individual envelopes in an upright position from said delivery means to a position in front of said pusher member, and means for retaining the transferred envelopes in said forward end and in stacked relation, said retaining means including a pair of pivotally mounted retaining fingers in yielding engagement with the rear side of said stack, and means cooperating with said retaining means for retracting said fingers to permit succeeding envelopes to be added to the stack.

GUSTAF W. ANDERSON.